(12) United States Patent
Charaniya et al.

(10) Patent No.: US 8,543,459 B2
(45) Date of Patent: *Sep. 24, 2013

(54) TARGETING BASED ON INTENT OR PRESENCE

(75) Inventors: Amin Charaniya, Santa Clara, CA (US); Aileen Tang, Union City, CA (US); Ankur Gupta, Bangalore (IN); James Dowdell, Menlo Park, CA (US); Smita Hashim, Saratoga, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,452

(22) Filed: Jul. 25, 2012

(65) Prior Publication Data

US 2013/0138500 A1 May 30, 2013

Related U.S. Application Data

(63) Continuation of application No. 13/306,513, filed on Nov. 29, 2011, now Pat. No. 8,239,266.

(51) Int. Cl.
*G06Q 30/00* (2012.01)
*H04W 24/00* (2009.01)

(52) U.S. Cl.
USPC .................. 705/14.54; 705/14.58; 455/456.3

(58) Field of Classification Search
USPC .......................... 705/14.54, 14.58; 455/456.3
See application file for complete search history.

(56) References Cited

U.S. PATENT DOCUMENTS

| | | | |
|---|---|---|---|
| 6,587,835 B1 | 7/2003 | Treyz et al. | |
| 7,577,244 B2 | 8/2009 | Taschereau | |
| 7,603,360 B2 | 10/2009 | Ramer et al. | |
| 8,229,458 B2 * | 7/2012 | Busch | 455/456.1 |
| 8,239,266 B1 * | 8/2012 | Charaniya et al. | 705/14.54 |
| 2008/0086368 A1 | 4/2008 | Bauman et al. | |
| 2009/0172724 A1 | 7/2009 | Ergen et al. | |
| 2010/0185517 A1 | 7/2010 | Higgins et al. | |
| 2010/0191600 A1 | 7/2010 | Sideman | |

FOREIGN PATENT DOCUMENTS

| | | |
|---|---|---|
| KR | 20080037331 A | 4/2008 |
| KR | 20090033989 A | 4/2009 |

OTHER PUBLICATIONS

Morrissey, B., "TiVo Execs Bet Google Ad Model Will Work on TV," ADWEEK Online, p. NA, Dec. 5, 2005.

(Continued)

*Primary Examiner* — Donald L. Champagne
(74) *Attorney, Agent, or Firm* — McDermott Will & Emery LLP

(57) ABSTRACT

Methods, systems, and apparatus, including computer programs encoded on a computer-readable storage medium, for campaign management. A method includes: presenting a user interface to a sponsor for customizing targeting information for a campaign including a control for specifying targeting criteria, where at least one targeting criterion includes a presence of a user in a prescribed geographic location or an indication of an interest by a user in the location; receiving a selection from the sponsor of targeting criteria to be associated with the campaign including a selection of one or both of user presence and interest; evaluating content delivery options for presenting content associated with the campaign including determining for a given content request whether a user is present or merely interested in a geographic location; and serving content from the campaign when a content item request satisfies the targeting criteria for the campaign.

29 Claims, 6 Drawing Sheets

(56) References Cited

OTHER PUBLICATIONS

"Microsoft Advertising—How to Target a City," [online] [Retrieved on Dec. 6, 2011]; Retrieved from the Internet URL: http://community.microsoftadvertising.com/forums/t/68292.aspx, Feb. 6, 2011, 3 pages.

Perez, S., "Facebook Ads to Target you by Location and Language," [online] [Retrieved on Dec. 6, 2011]; Retrieved from the Internet URL: http://www.readwriteweb.com/archives/facebookads_to_target_you_by_location_and_language.php, Mar. 12, 2009, 4 pages.

"What Account Features Are Available to Help me Market my Business?" [online] [Retrieved on Dec. 6, 2011]; Retrieved from the Internet URL: http://web.archive.org/web/20090111085803/http://help.yahoo.com/l/us/yahoo/ysm/sps/articles/features_tools4.html, Jan. 11, 2009, 1 page.

* cited by examiner

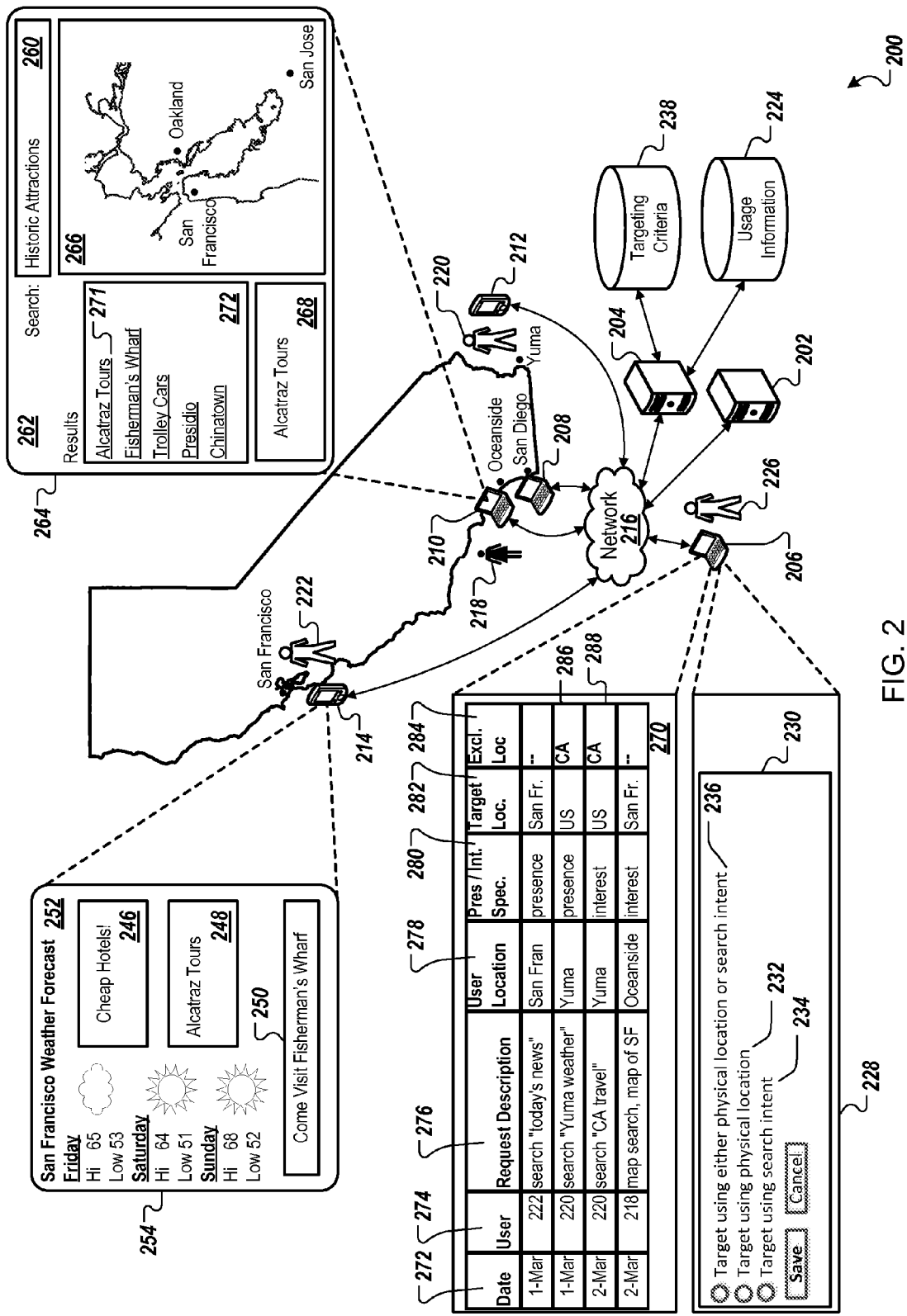

TARGETING BASED ON INTENT OR PRESENCE

RELATED APPLICATION

This application is a continuation application of, and claims priority to, U.S. application Ser. No. 13/306,513, entitled TARGETING BASED ON INTENT OR PRESENCE, filed on Nov. 29, 2011. The disclosure of the foregoing application is incorporated herein by reference in its entirety.

BACKGROUND

This specification relates to content management.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for providing content. The method comprises: presenting a user interface to a campaign sponsor for customizing targeting information for a campaign including a user selectable control for specifying one or more targeting criteria, where at least one targeting criterion includes a presence of a user in a prescribed geographic location or an indication of an interest by a user in the prescribed geographic location; receiving a selection from the campaign sponsor of one or more targeting criteria to be associated with the campaign including a selection of one or both of user presence and interest; evaluating content delivery options for presenting content associated with the campaign including determining for a given content request whether a user is present or merely interested in a geographic location; and serving content from the campaign when a content item request satisfies the targeting criteria for the campaign.

These and other implementations can each optionally include one or more of the following features. Determining whether a user is present or merely interested in the geographic location can include evaluating one or more user signals. The user signals can include one or more of an IP address of a client device that submitted the content item request, a location-based signal available to the client device, one or more location-related terms associated with the content item request, a time that the content item request was submitted, a mode of the user, where the mode is selected from at work, home, or away, and location information describing a location that was presented in a map application viewport on the client device at the time the content item request was submitted.

In general, another aspect of the subject matter described in this specification can be implemented in methods that include a method for serving content. The method comprises: enabling a content item sponsor to target content to users based on whether a content item request is associated with a user at a particular location or is associated with a user that has expressed an interest in the particular location, including enabling a content sponsor to exclude presentation of their content for at least one of these types of requests, where enabling includes receiving a presence/interest specification from the content item sponsor for a campaign; evaluating a received content item request to determine a likelihood that the user is at a given location; evaluating the received content item request to determine a likelihood that the user is merely interested in the given location but is not physically present at the given location; and providing content from a content sponsor in response to the received content item request only if targeting criteria for the campaign match the request including satisfying a presence/interest specification from a respective content item sponsor for the campaign.

These and other implementations can each optionally include one or more of the following features. Evaluating a received content item request can include determining a geographic location associated with the request. Determining the geographic location can be based on location based services. Determining the geographic location can be based on an IP address associated with the request. The likelihood that a user is at a given location can be expressed in terms of a probability. The probability can be above a first threshold. The likelihood that a user is merely interested in the given location can be expressed in terms of a probability. The probability can be above a second threshold. The method can include tracking details of how each content delivery by a content delivery service satisfied the content sponsor's presence/interest specification. The method can include, for each delivered content item, determining performance information for a respective content item for when the content item was provided based on the user being at a given location and when the content item was provided based on the user being interested in but not physically present at the given location. The performance information can include click through rate and conversion information. The method can include providing to the content sponsor a report that includes the tracked details and the performance information for a time interval. The report can include one or more controls which enable the content sponsor to optimize the campaign based on the performance information. The method can include automatically optimizing the campaign based on the performance information. Optimizing can include splitting the campaign into a first campaign with a first presence/interest specification corresponding to targeting users who are at a given location and a second campaign with a second presence/interest specification corresponding to targeting users who have expressed an interest in a given location. A first bid associated with the first campaign can be different than a second bid associated with the second campaign. Optimizing can include splitting a campaign into multiple campaigns based on location information.

In general, another aspect of the subject matter described in this specification can be implemented in computer program products that include a computer program product tangibly embodied in a computer-readable storage device that comprises instructions that, when executed by a processor, cause the processor to perform operations. The operations include: presenting a user interface to a campaign sponsor for customizing targeting information for a campaign including a user selectable control for specifying one or more targeting criteria, where at least one targeting criterion includes a presence of a user in a prescribed geographic location or an indication of an interest by a user in the prescribed geographic location; receiving a selection from the campaign sponsor of one or more targeting criteria to be associated with the campaign including a selection of one or both of user presence and interest; evaluating content delivery options for presenting content associated with the campaign including determining for a given content request whether a user is present or merely interested in a geographic location; and serving content from the campaign when a content item request satisfies the targeting criteria for the campaign.

These and other implementations can each optionally include one or more of the following features. Determining whether a user is present or merely interested in the geographic location can include evaluating one or more user signals. The user signals can include one or more of an IP address of a client device that submitted the content item request, a location-based signal available to the client device, one or more location-related terms associated with the content item request, a time that the content item request was submitted, a mode of the user, where the mode is selected from at work, home, or away, and location information describing a location that was presented in a map application viewport on the client device at the time the content item request was submitted. Evaluating content delivery options can include receiving a request and evaluating whether the request is associated with a user at a location or merely interested in the location. Evaluating content delivery options can include evaluating a received content item request including determining a geographic location associated with the request. Determining the geographic location can be based on location based services. Determining the geographic location can be based on an IP address associated with the request. Evaluating content delivery options can include determining a likelihood that a user is at a given location in terms of a probability, where the probability is above a first threshold. Evaluating content delivery options can include determining a likelihood that a user is merely interested in a given location in terms of a probability, where the probability is above a second threshold.

In general, another aspect of the subject matter described in this specification can be implemented in systems that include a system comprising a content delivery system and a campaign management user interface. The campaign management user interface can include a user selectable control for specifying one or more targeting criteria, where at least one targeting criterion includes a presence of a user in a prescribed geographic location or at least one targeting criterion includes an indication of an interest by a user in the prescribed geographic location. The campaign management user interface can be configured to receive a selection from a campaign sponsor of one or more targeting criteria to be associated with the campaign including a selection of one or both of user presence and interest. The content delivery system can be configured to: evaluate content delivery options for presenting content associated with the campaign including determining for a given content request whether a user is present or merely interested in a geographic location; and serve content from the campaign when a content item request satisfies the targeting criteria for the campaign.

These and other implementations can each optionally include one or more of the following features. Determining whether a user is present or merely interested in the geographic location can include evaluating one or more user signals. The user signals can include one or more of an IP address of a client device that submitted the content item request, a location-based signal available to the client device, one or more location-related terms associated with the content item request, a time that the content item request was submitted, a mode of the user, where the mode is selected from at work, home, or away, and location information describing a location that was presented in a map application viewport on the client device at the time the content item request was submitted.

Particular implementations may realize one or more of the following advantages. A campaign sponsor can be enabled to target content to users based on whether a content item request is associated with a user at a particular location or is associated with a user that has expressed an interest in the particular location. A campaign sponsor can receive a report that indicates which content items were served based on an associated user being at a given location and which content items were served based on an associated user being interested in the given location but not physically present at the given location. A content campaign can be automatically optimized based on tracked information which indicates, for multiple content item requests, whether respective content items were served based on the user associated with the request being at a given location or interested in but not physically present at the location.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates an example system for serving content.

Like reference numbers and designations in the various drawings indicate like elements.

DETAILED DESCRIPTION

A user interface can be presented to a campaign sponsor for customizing targeting information for a campaign. The user interface can include a user selectable control for specifying one or more targeting criteria, where at least one targeting criterion includes a presence of a user in a prescribed geographic location or an indication of an interest by a user in the prescribed geographic location. A selection can be received from the campaign sponsor of one or more targeting criteria to be associated with the campaign including a selection of one or both of user presence or/and interest. In response to a received content request for a user, a content management system can determine whether the user is present or merely interested in a geographic location, and based on the determination, content from the campaign can be served when a content item request satisfies the targeting criteria for the campaign, including satisfying the user presence criterion and/or the interest criterion.

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of the user cannot be determined.

Figure 1:
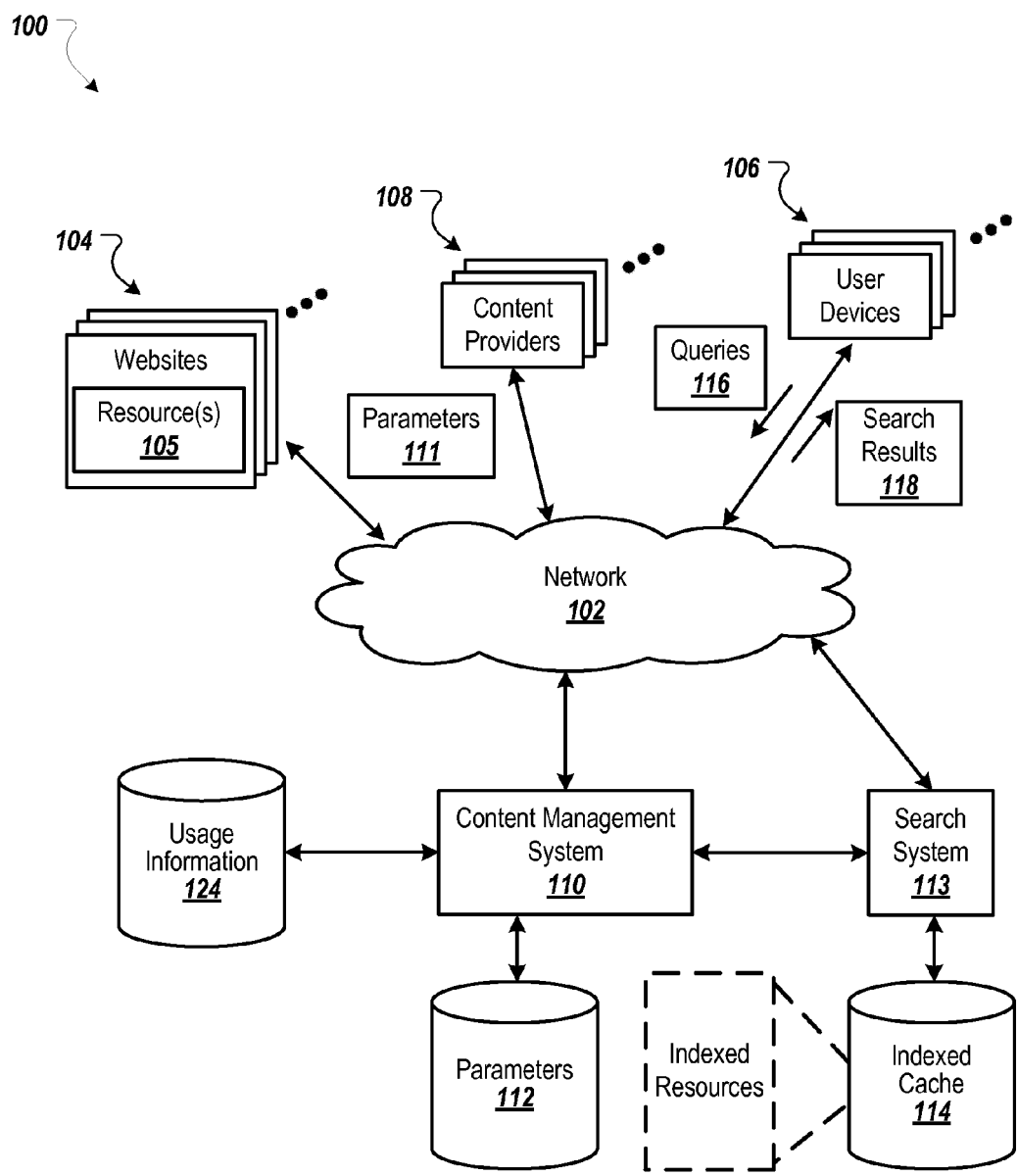
FIG. 1 is a block diagram of an example environment for providing content to a user.

FIG. 1 is a block diagram of an example environment 100 for providing content to a user. The example environment 100 includes a network 102, such as a local area network (LAN), a wide area network (WAN), the Internet, or a combination thereof. The network 102 connects websites 104, user devices 106, content providers 108, publishers, and a content management system 110. The example environment 100 may include many thousands of websites 104, user devices 106, and content providers 108. The content management system 110 may be used for selecting and providing content in response to requests for content. The content providers 108 can be, for example, advertisers. Other types of content providers are possible.

A content provider 108 can create a content campaign using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

The content provider 108 can, using the account management user interfaces, provide campaign parameters 111 which define a content campaign. The campaign parameters 111 can be stored in a parameters data store 112. Campaign parameters 111 can include, for example, a campaign name, a preferred content network for placing content, a budget for the campaign, start and end dates for the campaign, a schedule for content placements, content (e.g., a creative), and targeting criteria. Targeting criteria can include, for example, a targeted language, one or more targeted geographical locations, and a presence/interest specification.

One account management user interface can include one or more controls for specifying targeting criteria, such as a control that is used to specify the presence/interest specification. The presence/interest specification indicates whether the content provider 108 desires to target users based on a presence of a user in a prescribed geographic location, based on an indication of an interest by a user in the prescribed geographic location, or both. A campaign can be created and activated for the content provider 108 according to the parameters 111 specified by the content provider 108.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, images and sounds, that may include embedded information (such as meta-information hyperlinks) and/or embedded instructions (such as JavaScript scripts).

To facilitate searching of resources 105, the environment 100 can include a search system 113 that identifies the resources 105 by crawling and indexing the resources 105 provided by the content publishers on the websites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources 105 over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. User devices 106 can also submit search queries 116 to the search system 113 over the network 102.

Some search queries 116 can be submitted using a map application. The search system 113 can, for example, provide a map application which can present a search control along with a viewport for use in presenting location data. A map showing a particular location can be presented in the viewport and the user can enter one or more query terms using the search control.

In response to a search query 116, the search system 113 can access the indexed cache 114 to identify resources 105 that are relevant to the search query 116. The search system 113 identifies the resources 105 in the form of search results 118 and returns the search results 118 to the user devices 106 in one or more search results pages. In some implementations, a search result 118 is data generated by the search system 113 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The search system 113 or the content information system 110 can update usage information 124 based on user activities, such as requests for resources 105, search queries 116, other requests for content, web sites visited, or interactions with content. In some implementations, the usage information 124 can be derived, for example, from one or more of a search query log, an advertisement log, or requests for content. The usage information 124 can include, for each entry, a timestamp, an IP (Internet Protocol) address associated with a requesting user device 106, a type of usage, a location of interest associated with the activity (if any), the location of the user when the activity occurred, and other details associated with the usage.

The usage information 124 can be used for various purposes, such as to determine targeting information. For example, targeting information can be determined for a particular location, such as to target users who appear to be traveling to or are physically located in the particular location or who have otherwise expressed an interest in the particular location. For example, the content management system 110 can determine targeting information for a location based on historical information that matches a pattern of users that have traveled to or planned travel to the particular location.

After targeting information has been determined for a particular location, a request for content can be received from a user. The request for content can be, for example, a request for a resource 105 or a search query 116 from a user device 106. The content management system 110 can determine whether the user is present or merely interested in a geographic location associated with the request. For example, search query terms associated with the request may include or indicate a location of interest. For example, search query terms may include a zip code, a city name, or an address. As another example, a search query term of "Golden Gate Bridge" may indicate a location of "San Francisco". A location of interest can also be determined based on location information associated with a location displayed in a map viewport at the time the request was submitted.

The content management system 110 can determine the location of the user at the time of submission of a request for content, based, for example, on an IP address of a user device 106 that submitted the request. As another example, the user device 106 can determine the location of the user using a location based service (e.g., a GPS (Global Positioning System) service) and can communicate the location to the search system 113 and/or the content management system 110. A user's location can also be determined based on a mode (e.g., home, work, away) of the user, which may be determined based on the day and/or time of the request. In some implementations, the content management system 110 can determine whether the user is traveling to the location, such as by comparing the location of the user to a home location associated with the user.

The content management system 110 can serve content from the campaign to the requesting user device 106 when the content item request satisfies the targeting criteria for the campaign, such as if the content item request satisfies the presence/interest specification. For example, if the presence/interest specification indicates that the content provider 108 desires to target users who are present at one or more particular locations and if the content management system 110 determines that the user is located at one of the particular locations, the content management system 110 can serve content to the user. As another example, the content management system 110 can serve content if the presence/interest specification indicates that the content provider 108 desires to target users who have expressed interest in one or more particular locations and the content management system 110 determines that the user has expressed an interest in one or more of the particular locations. The content management system 110 can provide content to the user based at least in part on particular targeting information previously determined from the usage information 124.

The content management system 110 can use other criteria to select content items to provide in response to the request. For example, the request for content can include characteristics (e.g., size, supported media types) of one or more content "slots" that are defined for the requested resource 105 or search results page. As another example, resource keywords associated with a requested resource 105 or a search query 116 can be provided to the content management system 110. Content items selected by the content management system 110 can include content items having characteristics matching the characteristics of content slots and that are identified as relevant to specified resource keywords or search queries 116. For example, content items having targeting keywords that match the resource keywords or the search query 116 can be selected by the content management system 110. The content management system 110 can also select content items at least in part based on the results of an auction.

FIG. 2 illustrates a block diagram of an example system 200 for providing content to a user. The system 200 includes a search system 202, a content management system 204, a campaign sponsor client device 206, and user devices 208, 210, 212, and 214, connected to a network 216. The content management system 204 can receive requests for content from user devices 208-214, over the network 216. For example, a user 218 can submit search queries while using the user device 208 while at work in San Diego. Similarly, the user 218 can submit search queries while using the user device 210 while at home in Oceanside. The user device 210 may be the same device as the user device 208 or may be a different device. Other examples include the content management system 204 receiving a request for content from the user device 212 associated with a user 220 who resides in Yuma, Ariz. and receiving a request for content from the user device 214 (which may be the same device as the user device 212) when the user 220 travels to San Francisco (e.g., as illustrated by a user 222).

Historical information about queries, other requests for content, user content interactions, and other user activities can be stored in usage information 224. The content management system 204 can determine targeting information, such as targeting information that is associated with particular locations, such as Oceanside, Yuma, San Diego, and San Francisco. For example, the content management system 204 can group the usage information 224 by location (e.g., by recorded locations of users and/or recorded location of interest information associated with received user requests), and for each location, the content management system 204 can, for example, identify frequently used search terms entered by users who performed associated queries. Targeting information for a particular location can be determined based on the identified frequently used search terms for that location.

A campaign sponsor 206 can use the campaign sponsor client device 226 to access a user interface 228 provided by the content management system 204 to customize targeting information for a campaign. The user interface 228 can include, among other controls, a user selectable control 230 for specifying one or more targeting criteria. For example, the control 230 includes a control 232 which can be used to specify a targeting criterion of a presence of a user in a prescribed geographic location, a control 234 which can be used to specify a targeting criterion of an interest by a user in a prescribed geographic location, and a control 236 which can be used to specify targeting criteria that includes both the presence of a user in a prescribed geographic location or an interest by a user in a prescribed geographic location. A selection can be received from the campaign sponsor 226 of one or more targeting criteria to be associated with the campaign, including a selection of one of the controls 232, 234, or 236. An indication of the campaign sponsor's selection can be stored in a targeting criteria data store 238 as a presence/interest specification.

In response to a received content request for a user, it can be determined whether the user is present or merely interested in a particular geographic location, and based on the determination, content from the campaign can be served when a content item request satisfies the targeting criteria for the campaign, including satisfying the user presence criterion and/or the interest criterion. For example, if the presence/interest specification for the campaign sponsor 226 corresponds to targeting based on presence and if the campaign sponsor 226 has targeted the location of San Francisco, content provided by the campaign sponsor 226 may be provided to the user device 214 when the user 222 is traveling to San Francisco, such as content items 246, 248, and 250 included in content slots in a resource 252 displayed on a display device 254 of the user device 214. In contrast, the content items 246, 248, and 250 might not be displayed, for example, to the user 218, since the user 218 is not physically present in San Francisco.

Content may be provided to the user device 214 if the request for content matches targeting criteria other than the presence/interest specification. For example, a search keyword, such as "attractions" or "hotels", may match one or more targeting keywords provided by the campaign sponsor 226. When selecting content to provide to the user device 214, the content management system 204 can select one or more content items based at least in part on targeting information associated with the location of San Francisco previously determined from the usage information 224.

As another example, if the presence/interest specification for the campaign sponsor 226 corresponds to targeting based on interest and if the campaign sponsor 226 has targeted the location of San Francisco, content provided by the campaign sponsor 226 may be provided to the user device 210 in response to the user 218 performing a search 260 using a search application 262 displayed on a display device 264 while the San Francisco area is displayed in a map viewport 266. For example, a content item 268 provided by the campaign sponsor 226 may be provided to and displayed in the user device 210 in a content slot included in the search application 262. As another example, content provided by the campaign sponsor 226 may be provided to the user device 210 in response to the user 218 selecting a San Francisco related search result 271 included in a search results list 272 or in response to the user 218 performing a search that includes one or more San Francisco-related search terms.

In this example, where the presence/interest specification indicates targeting based on interest for the campaign sponsor 226, the content item 268 might not be displayed to the user 218 if the user 218 performs a search query that does not include a San Francisco-related search term. Similarly, the content item 268 might not be displayed to the user 222, even though the user 222 is in San Francisco, if the user 222 performs a search query that does not include a San Francisco-related search term and does not otherwise indicate a location of interest of San Francisco. If the user device 214 submits a request for content where the request for content does have a location of interest related to San Francisco, such as if the request for content is associated with the San Francisco weather report resource 252, then the content item 268 might be displayed to the user 222 (e.g., as illustrated by the content item 248).

Figure 3A:
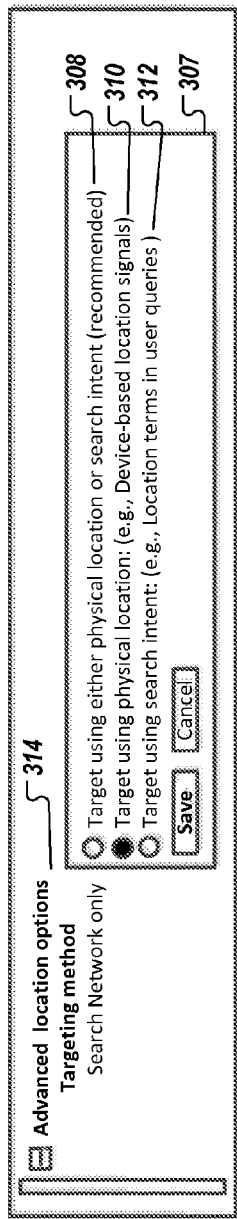
FIGS. 3A-3C illustrate example controls for specifying a presence/interest specification.
Figure 3B:
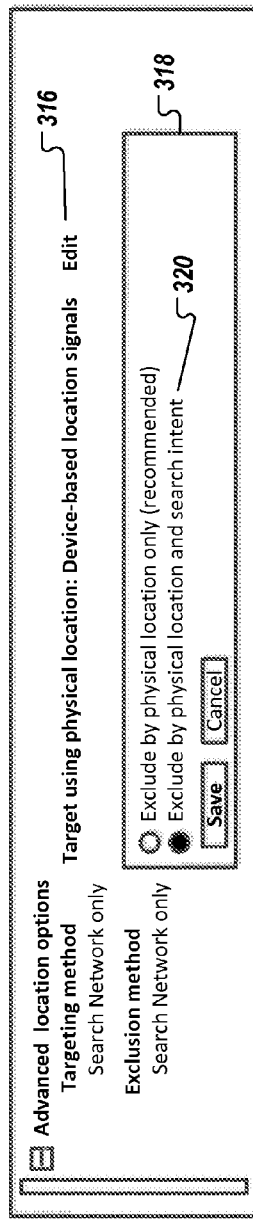
Figure 3C:
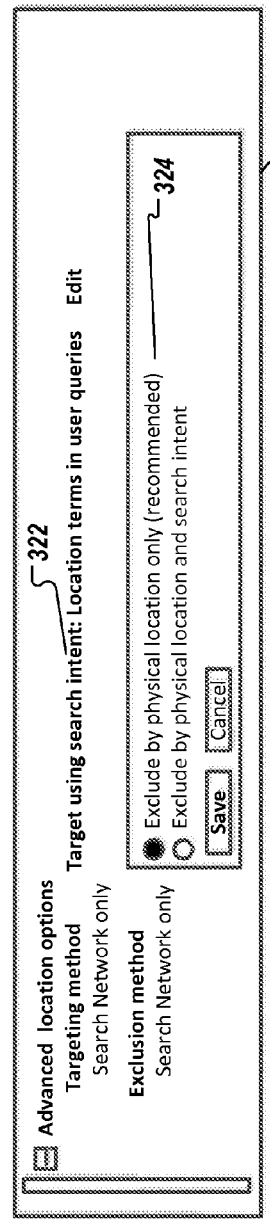

The presence/interest specification can indicate exclusion criteria as well as targeting criteria. For example, FIGS. 3A-3C illustrate example controls 302-306, respectively, that may be displayed in the user interface 228, for specifying a presence/interest specification. The control 302 is similar to the control 230, in that it includes a control 307 which includes controls 308, 310, and 312, which correspond to the controls, 236, 232, and 234, respectively. The controls 308, 310, and 312 can be displayed, for example, in response to selection of an advanced location options control 314. As indicated by the "recommended" phrase included in the label of the control 308, an option to target both based on presence and on interest can be recommended to a campaign sponsor, as targeting based on presence or on interest may result in fewer impressions for the campaign sponsor. For example, in some implementations, it is recommended that the campaign sponsor select the control 310 or the control 312 if the campaign sponsor has a particular reason to target based on presence or on interest, and to otherwise select the control 308.

In response to the campaign sponsor selecting the control 310, the control 304 (e.g., as shown in FIG. 3B) can be displayed in place of the control 302. The user can select a control 316 to cause the control 307 to reappear. The control 304 includes a control 318, which can be used to specify an exclusion method. For example, the control 318 includes a control 320 which the campaign sponsor can select to exclude based on physical location and search interest. If the control 320 is selected, associated content provided by the campaign sponsor is not shown to users who are physically located in an excluded location or who indicate an excluded location as a location of interest.

For example, referring again to FIG. 2, if the campaign sponsor 226 has targeted the United States, and has excluded based on physical location and search interest with an excluded location of California, content provided by the campaign sponsor 226 may be provided to the user device 212 if the user 220 does not indicate a location of interest related to California in a request for content, since the user device 212 is located within the United States but outside of California. In this example, content from the campaign sponsor 226 that is associated with the excluded location is not provided to the user device 212 if the user 222 indicates a location of interest of California. Also in this example, content from the campaign sponsor 226 that is associated with the excluded location is not provided to the user devices 208, 210, or 214, since those user devices are located in California.

Referring now to FIG. 3C, suppose the campaign sponsor has specified to target based on search intent (e.g., as illustrated by a label 322) and has selected a control 324 to exclude by physical location only and that an excluded location is the state of California. In this example, referring back to FIG. 2, content provided by the campaign sponsor 226 that is associated with the excluded location of California is not provided to the user devices 208, 210, or 214, since those user devices are located in California, even if associated requests for content indicate a location of interest related to California. Content might be provided to the user device 212, since the user device 212 is not in California, if the user 220 indicates a location of interest related to California.

As another example, in some implementations, the campaign sponsor 226 can specify to target users who are traveling to a particular location, such as San Francisco. For example, the content management system 204 can determine that the user 220 is a traveler who is currently located in San Francisco (e.g., as illustrated by the user 222), such as by comparing a home location of Yuma associated with the user 220 to a current location of San Francisco associated with a request received from the user device 214. For example, in some implementations, a home IP address and/or a work IP address can be associated with a user, and the user's current location can be determined to be a home location (e.g., Oceanside for the user 218), a work location (e.g., San Diego for the user 218), or an away (e.g., travel) location based on comparing an IP address associated with a content request to the home IP address and/or the work IP address of the user.

In some implementations, a report 270 can be provided to the campaign sponsor 226 where the report 270 includes details for a time interval for content delivery (e.g., the previous month) by the content management system 204 including details of how each delivery satisfied a presence/interest specification of the campaign sponsor 226. For example, the report 270 includes columns 272-284 indicating, for each delivery, if applicable, a date, a user, a description of the request that resulted in the delivery, the user's location, the value of the presence/interest specification at the time of the delivery, a targeted location, and an excluded location, respectively. The report 270 includes details for some of the examples discussed above where content was delivered to the user 218, 220, or 222. The report 270 can include other information. For example, the report 270 can indicate that the row 286 is associated with an exclude by physical location and search interest setting and that the row 288 is associated with an exclude by physical location only setting. As another example, the report 270 can include other information which indicates which content item(s) were served in response to each request.

In some implementations, the content management system 204 can, along with tracking details of how each content delivery by the content management system 204 satisfied a content sponsor's presence/interest specification, determine performance information for each respective content item for when the content item was provided based on the user being at a given location and when the content item was provided based on the user being interested in but not physically present at the given location. Performance information can include, for example, click through rate and conversion information.

The report 270 can include the performance information and can also include one or more controls which enable the content sponsor to optimize the campaign based on the performance information. For example, the content sponsor can select a control to split a campaign into a first campaign with a first presence/interest specification corresponding to targeting users who are at a given location and a second campaign with a second presence/interest specification corresponding to targeting users who have expressed an interest in a given location. The first and second campaigns can have, for example, different associated bid amounts and other, different campaign settings. As another example of optimizing, the content sponsor can split a campaign into two or more campaigns based on performance information associated with multiple locations. In some implementations, the content management system 204 can perform the example optimizations described above automatically based on the performance information.

Figure 4:
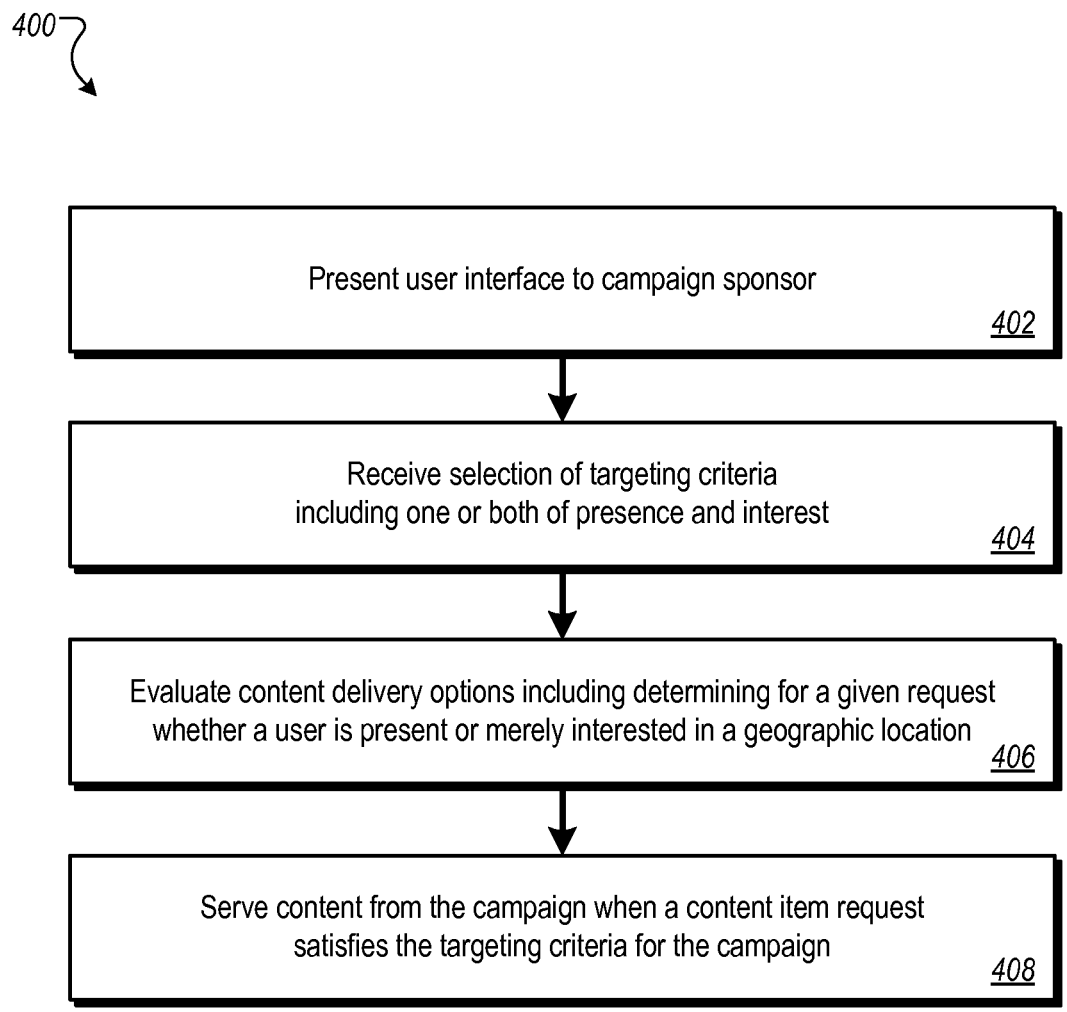
FIG. 4 is a flowchart of an example process for serving content.

FIG. 4 is a flowchart of an example process 400 for serving content. The process 400 can be performed, for example, by the content management system 110 described above with respect to FIG. 1. As another example, the process 400 can be performed by the content management system 204 described above with respect to FIG. 2.

A user interface is presented to a campaign sponsor (402) for customizing targeting information for a campaign, including a user selectable control for specifying one or more targeting criteria, where at least one targeting criteria includes a presence of a user in a prescribed geographic location or an indication of an interest by a user in the prescribed geographic location. For example, with respect to FIG. 2, the user interface 228, which includes the control 230 for specifying targeting using physical location (e.g., presence) and/or targeting using search interest (e.g., intent), can be presented to the campaign sponsor 226.

A selection is received from the campaign sponsor of one or more targeting criteria to be associated with the campaign, including a selection of one or both of user presence and interest (404). For example, the campaign sponsor 226 can select the control 232 to specify to target using user presence, can select the control 234 to specify to target using interest, or can select the control 236 to specify to target using either presence or interest.

Content delivery options are evaluated for presenting content associated with the campaign, including determining for a given content request whether a user is present or merely interested in a geographic location (406). For example, the content management system 110 can determine the location of a user from the user's user device 106, e.g., using global positioning system (GPS) capabilities of the user device 106, or obtained through cell triangulation, e.g., from three or more signal transmitters, towers or satellites that serve the user device 106. In some implementations, the location of the user device 106 can be obtained through periodic mobile check-ins, such as positional checkpoints made by the mobile device at regular intervals, or from a user's check-in at an establishment using, for example, a social application. As another example, the location of the user can be determined by geocoding an IP address of a client device (e.g., the user device 214) that submitted the content item request.

Whether a user is interested in the geographic location can be determined based on whether a location of interest is included in or associated with the content item request. For example, the user can include one or more location-related search terms (e.g., city names, state names, street names, ZIP codes, landmark names, etc.) in a search query. As another example, a location of interest can be determined from geographic information displayed in, or related to, a map viewport (e.g., the San Francisco area displayed in the map viewport 266). In some implementations, the location of interest can be inferred, for example, from the center-point coordinates of the map's viewport or from a destination included in driving directions provided by the map application.

Content from the campaign is served when a content item request satisfies the targeting criteria for the campaign (408). For example, if the targeting criteria indicates that the campaign sponsor desires to target users who are present at one or more particular locations and if the content management system 110 determines that the user is located at one of the particular locations, the content management system 110 can serve content to the user. For example, the content management system 204 can serve the content item 248 to the user device 214 based on determining that the campaign sponsor 226 has previously selected the control 232 and has targeted San Francisco and that the user 222 is located in San Francisco.

As another example, the content management system 110 can serve content if the targeting criteria indicates that the campaign sponsor desires to target users who have expressed interest in one or more particular locations and the content management system 110 determines that the user has expressed an interest in one or more of the particular locations. For example, the content management system 204 can serve the content item 268 to the user device 210 based on determining that the campaign sponsor 226 has previously selected the control 234 and has targeted San Francisco and that the user 218 has performed the search query 260 while the map viewport 266 displays the San Francisco area.

Figure 5:
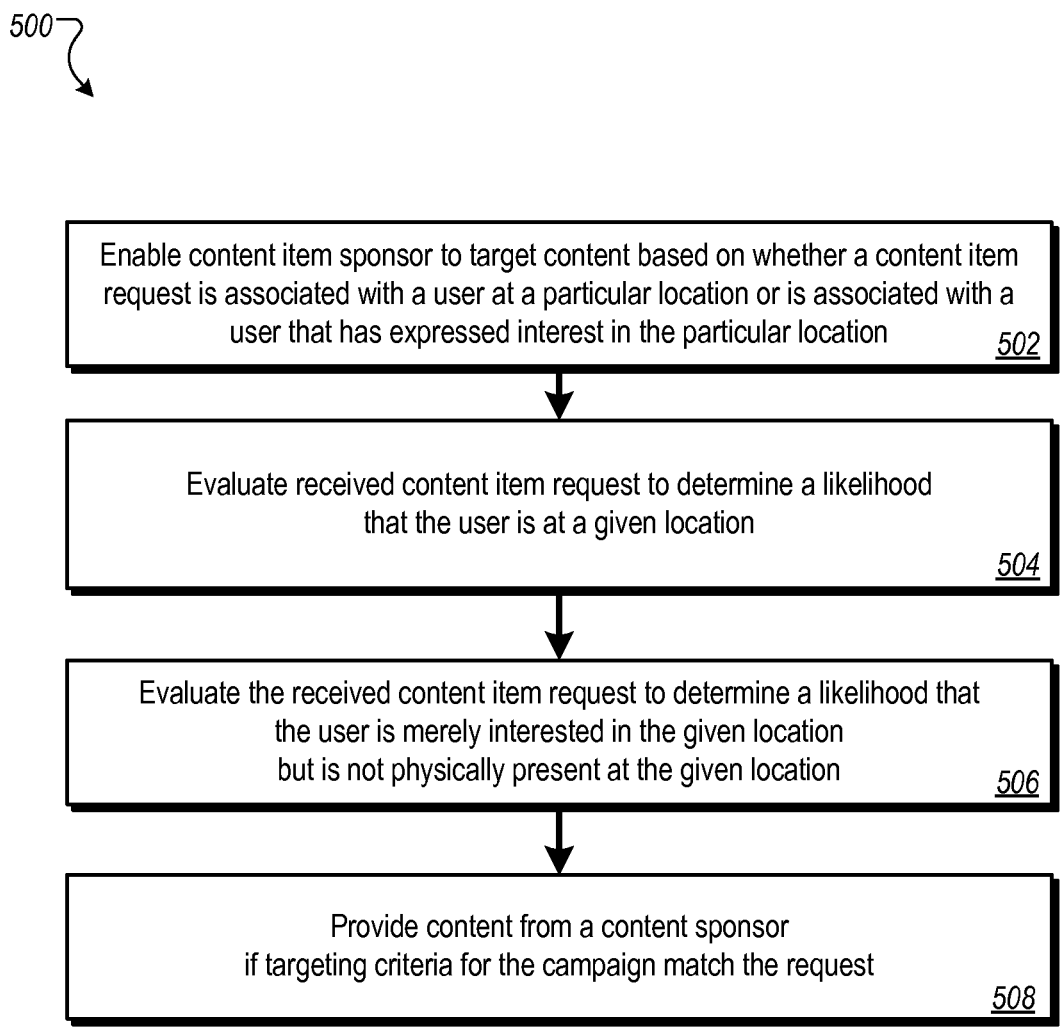
FIG. 5 is a flowchart of an example process for providing content to a user.

FIG. 5 is a flowchart of an example process 500 for providing content to a user. The process 500 can be performed, for example, by the content management system 110 described above with respect to FIG. 1. As another example, the process 500 can be performed by the content management system 204 described above with respect to FIG. 2.

A content item sponsor is enabled to target content to users based on whether a content item request is associated with a user at a particular location or is associated with a user that has expressed an interest in the particular location (502), including enabling a content sponsor to exclude presentation of their content for at least one of these types of requests, where enabling includes receiving a presence/interest specification from the content item sponsor for a campaign. For example, the content item sponsor can be presented with a user interface that includes the controls 302 or 304. The control 302 enables the content item sponsor to target content to users based on whether a content item request is associated with a user at a particular location or is associated with a user that has expressed an interest in the particular location. The control 304 enables the content item sponsor to specify exclusion criteria based on whether a user is at a location or whether a user has expressed interest in a location.

A received content item request is evaluated to determine a likelihood that the user is at a given location (504). For example, as described above, a user's location can be determined based on an IP address associated with the request, or based on location based services (e.g., GPS, cell triangulation). The likelihood can be expressed in terms of a probability.

The received content item request is evaluated to determine a likelihood that the user is merely interested in the given location but is not physically present at the given location (506). For example, it can be determined that the user is not physically present at the given location by comparing the user's current location to the given location (e.g., if the distance between the user's current location and the given location is more than a threshold, it can be determined that the user is not physically present at the given location). Whether the user is interested in the given location can be determined if the user has expressed an interest in the given location, such as by one or more location-related search terms, or other location-related information, such as the display of the given location in a map application. The likelihood can be expressed in terms of a probability.

Content from a content sponsor is provided in response to the received content item request only if targeting criteria for the campaign match the request including satisfying a presence/interest specification from a respective content item sponsor for the campaign (508). For example, content can be served if the presence/interest specification indicates that the content item sponsor desires to target based on presence of the user and if the likelihood that the user is at the given location is greater than a first threshold. As another example, content can be served if the presence/interest specification indicates that the content item sponsor desires to target based on interest of the user and if the likelihood that the user is interested in the given location is greater than a second threshold.

Figure 6:
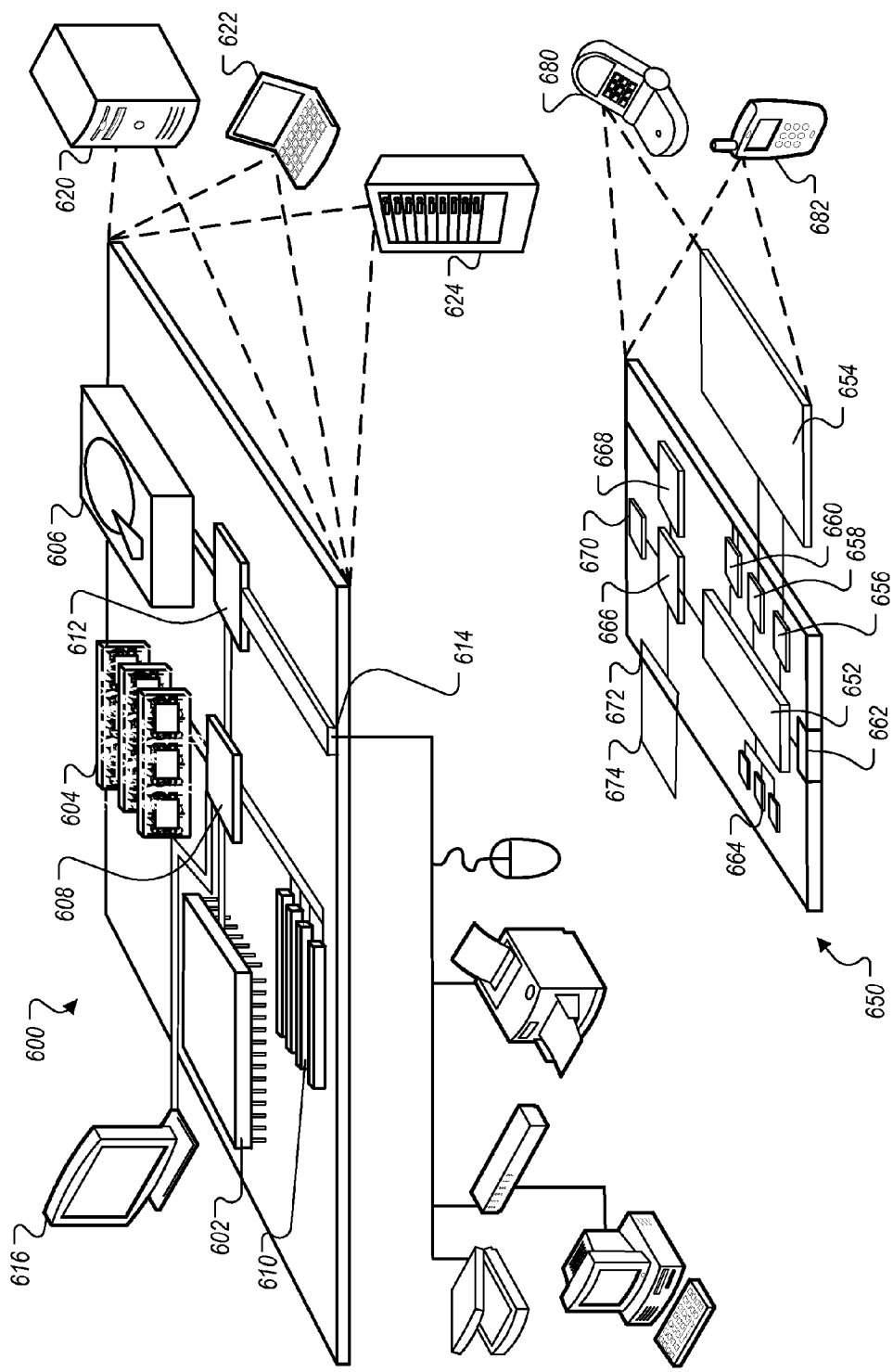
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

The invention claimed is:

1. A method comprising:
presenting, using one or more computing devices, a user interface to a campaign sponsor for customizing selection criteria for a campaign including a user selectable control for specifying one or more criteria, where at least one criterion includes a presence of a user in a prescribed geographic location or an indication of an interest by a user in the prescribed geographic location;
receiving, using the one or more computing devices, a selection from the campaign sponsor of one or more criteria to be associated with the campaign including a selection of one of user presence or interest;
determining, using the one or more computing devices, for a given content request whether a user is present or merely interested in a geographic location; and
serving, using the one or more computing devices, content from the campaign when a content item request satisfies the criteria for the campaign.

2. The method of claim 1 where determining whether a user is present or merely interested in the geographic location includes evaluating one or more user signals.

3. The method of claim 2 where the user signals include one or more of an IP address of a client device that submitted the content item request, a location-based signal available to the client device, one or more location-related terms associated with the content item request, a time that the content item request was submitted, a mode of the user, where the mode is selected from at work, home, or away, or location information describing a location that was presented in a map application viewport on the client device at the time the content item request was submitted.

4. A method comprising:
enabling a content item sponsor to present content to users based on whether a content item request is associated with a user at a particular location or is associated with a user that has expressed an interest in the particular location, including enabling a content sponsor to exclude presentation of their content for at least one of these types of requests, where enabling includes receiving a presence/interest specification from the content item sponsor for a campaign;
evaluating the received content item request to determine a likelihood that the user is merely interested in the given location but is not physically present at the given location; and
providing content from a content sponsor in response to the received content item request only if selection criteria for the campaign match the request including satisfying a presence/interest specification from a respective content item sponsor for the campaign.

5. The method of claim 4 where evaluating a received content item request includes determining a geographic location associated with the request.

6. The method of claim 5 where determining the geographic location is based on location based services.

7. The method of claim 5 where determining the geographic location is based on an IP (Internet Protocol) address associated with the request.

8. The method of claim 4 where the likelihood is expressed in terms of a probability, and where the probability is above a first threshold.

9. The method of claim 4 further comprising tracking details of how each content delivery by a content delivery service satisfied the content sponsor's presence/interest specification.

10. The method of claim 9 further comprising, for each delivered content item, determining performance information for a respective content item for when the content item was provided based on the user being at a given location and when the content item was provided based on the user being interested in but not physically present at the given location.

11. The method of claim 10 where performance information includes click through rate and conversion information.

12. The method of claim 10 further comprising providing to the content sponsor a report that includes the tracked details and the performance information for a time interval.

13. The method of claim 12 where the report includes one or more controls which enable the content sponsor to optimize the campaign based on the performance information.

14. The method of claim 10 further comprising automatically optimizing the campaign based on the performance information.

15. The method of claim 14 where optimizing includes splitting the campaign into a first campaign with a first presence/interest specification corresponding to users who are at a given location and a second campaign with a second presence/interest specification corresponding to users who have expressed an interest in a given location.

16. The method of claim 15 where a first bid associated with the first campaign is different than a second bid associated with the second campaign.

17. The method of claim 15 where optimizing includes splitting a campaign into multiple campaigns based on location information.

18. A computer program product tangibly embodied in a computer-readable storage device and comprising instructions that, when executed by a processor, cause the processor to:
present a user interface to a campaign sponsor for customizing selection criteria for a campaign including a user selectable control for specifying one or more criteria, where at least one criterion includes a presence of a user in a prescribed geographic location or an indication of an interest by a user in the prescribed geographic location;

receive a selection from the campaign sponsor of one or more criteria to be associated with the campaign including a selection of one of user presence or interest;

determine for a given content request whether a user is present or merely interested in a geographic location; and serve content from the campaign when a content item request satisfies the criteria for the campaign.

19. The computer program product of claim 18 where determining whether a user is present or merely interested in the geographic location includes evaluating one or more user signals.

20. The computer program product of claim 19 where the user signals include one or more of an IP address of a client device that submitted the content item request, a location-based signal available to the client device, one or more location-related terms associated with the content item request, a time that the content item request was submitted, a mode of the user, where the mode is selected from at work, home, or away, or location information describing a location that was presented in a map application viewport on the client device at the time the content item request was submitted.

21. The computer program product of claim 18 where evaluating content delivery options includes receiving a request and evaluating whether the request is associated with a user at a location or merely interested in the location.

22. The computer program product of claim 18 where evaluating content delivery options includes evaluating a received content item request including determining a geographic location associated with the request.

23. The computer program product of claim 22 where determining the geographic location is based on location based services.

24. The computer program product of claim 22 where determining the geographic location is based on an IP (Internet Protocol) address associated with the request.

25. The computer program product of claim 18 where evaluating content delivery options includes determining a likelihood that a user is at a given location in terms of a probability, and where the probability is above a first threshold.

26. The computer program product of claim 18 where evaluating content delivery options includes determining a likelihood that a user is merely interested in a given location in terms of a probability, and where the probability is above a second threshold.

27. A system comprising:
a processor; and
a computer readable medium having instructions thereon that, when executed by the processor, provide a content delivery system and a campaign management user interface, wherein:
the campaign management user interface includes a user selectable control for specifying one or more selection criteria, where at least one criterion includes a presence of a user in a prescribed geographic location or an indication of an interest by a user in the prescribed geographic location, the campaign management user interface configured to receive a selection from a campaign sponsor of one or more selection criteria to be associated with the campaign including a selection of one of user presence or interest; and the content delivery system is configured to:
evaluate content delivery options for presenting content associated with the campaign including determining for a given content request whether a user is present or merely interested in a geographic location; and serve content from the campaign when a content item request satisfies the targeting criteria for the campaign.

28. The system of claim 27 where determining whether a user is present or merely interested in the geographic location includes evaluating one or more user signals.

29. The system of claim 28 where the user signals include one or more of an IP address of a client device that submitted the content item request, a location-based signal available to the client device, one or more location-related terms associated with the content item request, a time that the content item request was submitted, a mode of the user, where the mode is selected from at work, home, or away, or location information describing a location that was presented in a map application viewport on the client device at the time the content item request was submitted.

\* \* \* \* \*